United States Patent
Meng et al.

(10) Patent No.: US 12,473,423 B2
(45) Date of Patent: Nov. 18, 2025

(54) ORGANIC PHOSPHOROUS COMPOUND FLAME RETARDANT, PREPARATION METHOD AND APPLICATIONS THEREOF

(71) Applicant: WEIHAI HELEN NEW-MATERIAL TECH CO., LTD., Shandong (CN)

(72) Inventors: Fanxu Meng, Shandong (CN);
Renchun Tian, Shandong (CN);
Huanyang Du, Shandong (CN);
Haoliang Xu, Shandong (CN); Jun Zheng, Shandong (CN)

(73) Assignee: WEIHAI HELEN NEW-MATERIAL TECH CO., LTD., Shandong (CN)

( * ) Notice: Subject to any disclaimer, the term of this patent is extended or adjusted under 35 U.S.C. 154(b) by 806 days.

(21) Appl. No.: 17/842,808

(22) Filed: Jun. 17, 2022

(65) Prior Publication Data
US 2022/0325074 A1   Oct. 13, 2022

Related U.S. Application Data

(63) Continuation of application No. PCT/CN2020/092876, filed on May 28, 2020.

(30) Foreign Application Priority Data

Jan. 7, 2020   (CN) .......................... 202010014139.7

(51) Int. Cl.
*C08K 5/5313*   (2006.01)
*C07F 9/30*   (2006.01)
*C08K 7/14*   (2006.01)

(52) U.S. Cl.
CPC ............ C08K 5/5313 (2013.01); C07F 9/301 (2013.01); *C08K 2201/005* (2013.01)

(58) Field of Classification Search
CPC ......... C08K 5/5313; C08K 7/14; C08L 23/06; C08L 67/02; C08L 75/04; C08L 77/02; C08L 77/06

See application file for complete search history.

(56) References Cited

FOREIGN PATENT DOCUMENTS

| CN | 1280582 | 1/2001 |
|---|---|---|
| CN | 103951700 | 7/2014 |
| CN | 105646938 | 6/2016 |
| CN | 107828207 | 3/2018 |
| CN | 107936055 | 4/2018 |
| CN | 108997611 | 12/2018 |
| CN | 111116988 | 5/2020 |

OTHER PUBLICATIONS

CN 106395773 A (Year: 2017).*
CN 109338341 A (Year: 2019).*
"International Search Report (Form PCT/ISA/210) of PCT/CN2020/092876," mailed on Oct. 10, 2020, with English translation thereof, pp. 1-5.

* cited by examiner

*Primary Examiner* — Joseph D Anthony
(74) *Attorney, Agent, or Firm* — JCIPRNET

(57) ABSTRACT

The invention relates to an organic phosphorous compound flame retardant, their preparation methods and applications. The organic phosphorous compound flame retardants are prepared by drop-wise adding at least one from the soluble salts of di-alkyl hypophosphorous acid or soluble salts of mono-alkyl hypophosphorous acid as well as at least one from the soluble salts of alkyl phosphorous acid or soluble salts of phosphorous acid into the solution of soluble non-halogen salt of II-IV valent metal to react, or drop-wise adding at least one from the di-alkyl hypophosphorous acid or mono-alkyl hypophosphorous acid, and at least one from the alkyl phosphorous acid or phosphorous acid into at least one from the active oxides or hydroxides of II-IV valent metal to react.

3 Claims, No Drawings

ORGANIC PHOSPHOROUS COMPOUND FLAME RETARDANT, PREPARATION METHOD AND APPLICATIONS THEREOF

CROSS-REFERENCE TO RELATED APPLICATION

This application is a continuation of international application of PCT application serial no. PCT/CN2020/092876 filed on May 28, 2020, which claims the priority benefit of China application no. 202010014139.7 filed on Jan. 7, 2020. The entirety of each of the above mentioned patent applications is hereby incorporated by reference herein and made a part of this specification.

BACKGROUND

Technical Field

The invention relates to the technical field of flame retardants, specifically to an organic phosphorous compound flame retardant and their preparation method and applications.

Description of Related Art

Since Clariant applied a series of patents for alkyl hypophosphorous acid and alkyl hypophosphites in 1998, the alkyl hypophosphites have been the most favorite non-halogen flame retardant at home and abroad so far. Nevertheless, the decomposition temperature of the existing alkyl hypophosphites, especially the aluminum diethylphosphinate (ADP), is low (around 360° C.), which severely limits their applications in the materials for high-temperature resistance such as engineering plastics.

In spite that some patents raised some improvement methods so far, for example, the flame retardant-stabilizer mix for thermoplastics polymers by ZL 201611204273.3 proposed to simply mix the substances like phosphites, alkyl phosphites and MPP to improve the stability and easy processibility of the flame retardants. ZL 201810902349.2 proposed a method, the products and applications for improving the high-temperature stability of the flame retardants of melamine derivatives using alkyl phosphorous metal salt, which also mentioned to use the phosphites or alkyl phosphites to improve the high-temperature stability of MPP so as to enable MPP to be applied in nylon materials. Those patents all employ the means of simply mixing materials to improve the high-temperature stability of alkyl hypophosphites or melamine derivatives, so as to increase the application scenarios of alkyl hypophosphites.

After all, the methods of simple mixing cannot form new chemical bonds, thus the temperature resistance of the alkyl hypophosphites are not improved very well. Therefore, they are potential to decompose earlier when being processed at high temperature, for example, the issues like bubbling and breakage during Nylon processing.

SUMMARY

The invention aims to solve the shortages of the aforementioned technologies and provide an organic phosphorous compound flame retardant having higher decomposition temperature and better flame retardant performance.

Thus, the invention provides a method of preparing an organic phosphorous compound flame retardant, which is characterized in that it consists of the following steps.

Evenly mixing at least one from the soluble salts of di-alkyl hypophosphorous acid or soluble salts of mono-alkyl hypophosphorous acid as well as at least one from the soluble salts of alkyl phosphorous acid or soluble salts of phosphorous acid in a molar mass ratio of 1~10 between the total di-alkyl hypophosphite and/or mono-alkyl hypophosphite versus the total alkyl phosphite and/or phosphite, then drop-wise adding them into a solution of soluble non-halogen II~IV valent metal salt in a molar mass ratio of 0.01~10 between the total metal ions versus the total di-alkyl hypophosphite and/or mono-alkyl hypophosphite and alkyl phosphite and/or phosphite at a reaction temperature controlled to 0° C.~200° C., then continuing to agitate them 0~10 hours after the adding ended, finally filtering, washing, drying and comminuting the yielded turbid solution to obtain compound salt particles having a grain size of 0.001 μm to 100 μm, that is, the organic phosphorus compound flame retardant described above.

Or first drop-wise adding at least one from the soluble salts of alkyl phosphorous acid or soluble salts of phosphorous acid into a solution of soluble non-halogen II~IV valent metal salt to react and obtain a clear aqueous solution, then continuing to drop-wise at least one from the soluble salts of di-alkyl hypophosphorous acid or soluble salts of mono-alkyl hypophosphorous acid into the obtained clear aqueous solution wherein the ratios of added substances, reaction conditions and subsequent processing are the same as above, finally obtaining the same organic phosphorus compound flame retardant described above.

Preferentially, the soluble salt of the di-alkyl hypophosphorous acid or the soluble salt of the mono-alkyl hypophosphorous acid, and the soluble salt of the alkyl phosphorous acid or the soluble salt of phosphorous acid is prepared respectively from any reaction between the corresponding di-alkyl hypophosphorous acid, mono-alkyl hypophosphorous acid, alkyl phosphorous acid, phosphorous acid and the alkali metals or their oxides or their cyanides or their hydroxides.

A preparation method for an organic phosphorous compound flame retardant, which is characterized in that: it comprises the following steps.

Evenly mixing at least one from di-alkyl hypophosphorous acids or mono-alkyl hypophosphorous acids as well as at least one from alkyl phosphorous acids or phosphorous acids in a molar mass ratio of 1~10 between the total di-alkyl hypophosphite and/or mono-alkyl hypophosphite versus the total alkyl phosphite and/or phosphite, then drop-wise adding them into at least one from the active oxides or hydroxides of an II-IV valent metal to react in a molar mass ratio of 0.01~10 between the total metal ions versus the total di-alkyl hypophosphite and/or mono-alkyl hypophosphite and alkyl phosphite and/or phosphite, the adding process is carried in a kneading machine of which the temperature is controlled to 0° C.~200° C. and continuing to knead after the adding ended until a fine lump or powder product is yielded, finally comminuting them to obtain compound salt particles having a grain size of 0.001 μm to 100 μm, that is, the organic phosphorus compound flame retardant described above.

Preferentially, the di-alkayl hypophosphorous acids, mono-alkyl hypophosphorous acids have the following general formula (1):

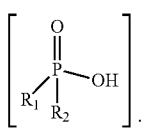

In the structural formula (1), the R1 and R2 are the same or not, and both at least one selected from hydrogen, saturated alkyl groups of C1~C6, aralkyl groups of C7~C18 or alkaryl groups of C7~C18 and form no, one or more rings between R1 and R2.

Preferentially, the di-alkyl hypophosphorous acid is at least one from di-ethyl hypophosphorous acid, di-methyl hypophosphorous acid, phenyl ethyl hypophosphorous acid, cyclohexyl ethyl hypophosphorous acid, bis-(2-methyl) propyl hypophosphorous acid (bis-isobutyl hypophosphorous acid) or methyl ethyl hypophosphorous acid.

Preferentially, the mono-alkyl hypophosphorous acid is at least one from methyl hypophosphorous acid, ethyl hypophosphorous acid or phenyl hypophosphorous acid.

Preferentially, the alkyl phosphorous acids and phosphorous acids have the following general formula (2):

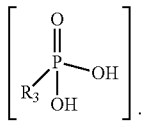

In the structural formula (2), the R3 is at least one selected from hydrogen, saturated alkyl groups of C1~C6, alkyl naphthenic group of C3~C18, aralkyl groups of C7~C18 or alkaryl groups of C7~C18.

Preferentially, the alkyl phosphorous acid is at least one from ethyl phosphorous acid, methyl phosphorous acid, cyclohexyl phosphorous acid or 1-butyl phosphorous acid.

Preferentially, the II-IV valent metal is at least one from Mg, Ca, Fe, Al, Zn, Sn, Mn, Ni, Ti, Ge, Ba, Sr, Ce, or Zr.

Preferentially, the soluble non-halogen salt of II-IV valent metal is at least one from the inorganic or organic II-IV valent metal salts and metal salt hydrates having limited water solubility such as aluminum sulfate and its hydrate, zinc sulfate and its hydrate, magnesium sulfate and its hydrate, manganese sulfate and its hydrate, titanium sulfate and its hydrate, cerous sulfate and its hydrate, cerous sulfate, ceric sulfate, zirconium sulfate, ferric sulfate, stannous mono-sulphate, calcium nitrate, magnesium nitrate, ferric nitrate, cerous nitrate, ceric nitrate, zirconium nitrate, titanium nitrate, nitrate barium, nickel nitrate, strontium nitrate, tin nitrate and barium nitrate, etc.

Preferentially, the soluble non-halogen salts of II-IV valent metal is at least one from aluminum sulfate and its hydrate, zinc sulfate and its hydrate, titanium sulfate and its hydrate or cerous sulfate and its hydrate.

Preferentially, the active metal oxides of II-IV valent metal is at least one from hydrated alumina, alumina, magnesia, zinc oxide, calcia, ceria, ferric oxide, titanium dioxide, barium oxide or strontia and the oxide is at least one from aluminium hydroxide, zinc hydroxide, cerium hydroxide, ferric hydroxide, calcium hydroxide, strontium hydroxide, titanium hydroxide or tin hydroxide.

An organic phosphorous compound flame retardant, which is characterized in that the aforementioned organic phosphorous compound flame retardant is prepared by any method described above.

Preferentially, the structural formula (3) of the organic phosphorous compound flame retardant is:

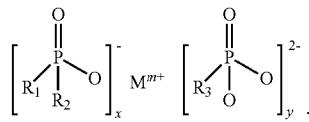

In the structural formula (3), the R1 and R2 are the same or not, and both at least one selected from hydrogen, saturated alkyl groups of C1~C6, aralkyl groups of C7~C18 or alkaryl groups of C7~C18 and form no, one or more rings between R1 and R2; the R3 is at least one selected from hydrogen, saturated alkyl groups of C1~C6, alkyl naphthenic group of C3~C18, aralkyl groups of C7~C18 or alkaryl groups of C7~C18; M is II-IV valent metal element and at least one selected from Mg, Ca, Fe, Al, Zn, Sn, Mn, Ni, Ti, Ge, Ba, Sr, Ce or Zr; M is 2~4; The x and y are both positive numbers being not less than 0.01 and not more than 10, including but not limited to a positive integer.

Preferentially, M bonds both with at least one from the di-alkyl hypophosphite or mono-alkyl hypophosphite and at least one from the alkyl phosphite or phosphite to form a new type of molecular structure.

Preferentially, x and y are both a positive number being not less than 0.1 and not more than 5, including but not limited to a positive integer.

Preferentially, R1, R2 and R3 are all at least one from hydrogen, methyl, ethyl, propyl, isopropyl, n-butyl, isobutyl, n-pentyl, 2-pentyl, 3-pentyl, 2-methylbutyl, 3-methylbutyl, 2,2-dimethyl propyl (neopentyl), n-hexyl, 2-hexyl, 3-hexyl, 2-methylpentyl, 3-methylpentyl, 2-ethylbutyl, 3-ethylbutyl, cyclohexyl, octyl, heptyl, nonyl, decyl, phenyl, phenmethyl, phenethyl or cyclohexylethyl.

An organic phosphorous compound flame retardant (ADEP hereinafter) can be applied alone in a polyester resin, polyamide resin, polyurethane, polyolefin material or rubber to obtain the corresponding polymers having good flame retardance. It can also be applied after being compounded with a synergetic flame retardant such as N based, Si based, P based, P—N based, aluminium hydroxide or magnesium hydrate. Among them, the polyester resin is selected from PET, PBT, TPEE, polyvinyl acetate, etc. The polyamide resin is selected from PA6, PA66, PA10, PA12, PA12T, PA46, PA410, PA310, PA6T, PA610, PA1212, PA612, PA10T, etc. The polyurethane is selected from TPU and thermosetting polyurethane, etc. The polyolefin material is selected from PP, PE, PVA, SEBS and its compounds, SBS and its compounds, PP, PE, EPDM, etc. The rubber is selected from EPDM, butyl rubber, natural rubber, butadiene rubber, cis-isoprene rubber, etc. The adding ratio of the organic phosphorous compound flame retardant is 0.01% to 80% of the total raw material mass.

The present invention provides an organic phosphorous compound flame retardant, their preparation methods and application having the following beneficial effects.

The present invention produces the organic phosphorous compound flame retardant by allowing at least one from the di-alkyl hypophosphorous acids or their soluble salts, the mono-alkyl hypophosphorous acids or their soluble salts as well as at least one from the alkyl phosphorous acids or their soluble salts, phosphorous acid or its soluble salts to react with the soluble non-halogen salt of II-IV valent metal or allowing at least one from the di-alkyl hypophosphorous acids or mono-alkyl hypophosphorous acids and at least one from the alkyl phosphorous acids or phosphorous acid to react with the active oxide or hydroxide of II-IV valent metal.

The organic phosphorous compound flame is a type of complex salt compounds whose structures contain both at least one from the di-alkyl hypophosphites or mono-alkyl hypophosphites and at least one from the alkyl phosphites or phosphites and is a type of flame retardants having new structures. Those organic phosphorous compound flames have a decomposition temperature of higher than 390° C. higher than that of aluminum diethylphosphinate as an issue. Thus, the temperature resistance and flame retardation are efficiently improved. Meanwhile, those products can be used in the polyesters, polyamides, polyurethanes, rubbers or polyolefin materials to improve the flame retardation more efficiently than only the di-alkyl hypophosphite. Especially in high-temperature engineering plastics and glass fiber reinforced/carbon fiber reinforced engineering plastics, only the di-alkyl hypophosphite (aluminum diethylphosphinate) is not efficient. If the MPP is added to improve the flame retardance, the phenomena such as bubbling and breaking will occur during extrusion and granulation. However, the high-temperature engineering plastics and glass fiber reinforced/carbon fiber reinforced engineering plastics with the added products by the present invention will not come with those issues. Also, if the same parts of flame retardants are added, the products according to the present invention can realize a level up to UL-94-V0 (2 mm) during the flame retardant test. But the di-alkyl hypophosphites can only produce a level of UL-94-V2 (2 mm).

Those organic phosphorous compound flames improved the temperature resistance and application scope of the di-alkyl hypophosphites and exerted a good flame retardance. They enable the alkyl hypophosphites and alkyl phosphites to be not only used in the materials such as polyesters to be processed at low temperature, but also to be applied in the processing at high temperature. For example, if used in the high-temperature Nylon, the products showed good flame retardance and no bubbling and breaking at a lower adding ratio. Thus, the production cost is also reduced and the application scope is also extended with a broad application prospect.

DESCRIPTION OF THE EMBODIMENTS

The present invention is further explained in combination with the following embodiments in order to help understand the invention contents. Unless specified otherwise, the methods employed in the present invention are all conventional ones and the raw materials and devices are all the regular commercial products.

Example 1

Dissolve both 121 g di-ethyl hypophosphorous acid and 110 g ethyl phosphorous acid in 1000 g water to obtain Solution (1), then add 120 g sodium hydroxide into Solution (1) to obtain the corresponding Na salt mixture solution (2). Dissolve 333 g $Al_2(SO_4)_3 \cdot 18H_2O$ into 1000 g water to obtain Solution (3). Add Solution (2) drop-wise into Solution (3) to react and get a turbid solution. Continue agitation for 0.5 h after the adding ends and control the reaction temperature to 0° C. Finally, filter, wash, dry and comminute the yielded turbid solution to get the compound salt ADEP.

Or first dissolve 122 g di-ethyl hypophosphorous acid in 500 g water and add 40 g NaOH to obtain Solution (4) then dissolve 110 g ethyl phosphorous acid in 500 g water and also add 80 g NaOH to obtain Solution (5). Then dissolve 333 g $Al_2(SO_4)_3 \cdot 18H_2O$ into 1000 g water to obtain Solution (6). First add Solution (5) drop-wise into Solution (6) to react and get a clear solution (7). Then add Solution (4) drop-wise into Solution (7) to react further and get a turbid solution. Continue agitation for 5 h after the adding ends and control the reaction temperature to 0° C. Finally, filter, wash, dry and comminute the yielded turbid solution to get the compound salt ADEP.

Example 2

Dissolve both 244 g di-ethyl hypophosphorous acid and 110 g ethyl phosphorous acid in 1500 g water to obtain Solution (8), then add 160 g sodium hydroxide into Solution (8) to obtain the corresponding Na salt mixture Solution (9). Dissolve 444 g $Al_2(SO_4)_3 \cdot 18H_2O$ into 1500 g water to obtain Solution (10). Add Solution (9) drop-wise into Solution (10) to react and get a turbid solution. Continue agitation for 3 h after the adding ends and control the reaction temperature to 50° C. Finally, filter, wash, dry and comminute the yielded turbid solution to get the compound salt ADEP.

Or first dissolve 244 g di-ethyl hypophosphorous acid in 1000 g water and add 80 g NaOH to obtain Solution (11). Then dissolve 110 g ethyl phosphorous acid in 500 g water and also add 80 g NaOH to obtain Solution (12). Then dissolve 444 g $Al_2(SO_4)_3 \cdot 18H_2O$ into 1500 g water to obtain Solution (13). First add Solution (12) drop-wise into Solution (13) to react and get a clear Solution (14). Then add Solution (11) drop-wise into Solution (14) to react further and get a turbid solution. Continue agitation for 8 h after the adding ends and control the reaction temperature to 70° C. Finally, filter, wash, dry and comminute the yielded turbid solution to get the compound salt ADEP.

Example 3

Dissolve both 732 g di-ethyl hypophosphorous acid and 110 g ethyl phosphorous acid in 2500 g water to obtain Solution (15), then add 320 g sodium hydroxide into Solution (15) to obtain the corresponding Na salt mixture solution (16). Dissolve 888 g $Al_2(SO_4)_3 \cdot 18H_2O$ into 2500 g water to obtain Solution (17). Add Solution (16) drop-wise into Solution (17) to react and get a turbid solution. Continue agitation for 9 h after the adding ends and control the reaction temperature to 80° C. Finally, filter, wash, dry and comminute the yielded turbid solution to get the compound salt ADEP.

Or first dissolve 732 g di-ethyl hypophosphorous acid in 2000 g water and add 240 g NaOH to obtain Solution (18). Then dissolve 110 g ethyl phosphorous acid in 500 g water and also add 80 g NaOH to obtain Solution (19). Then dissolve 888 g $Al_2(SO_4)_3 \cdot 18H_2O$ into 2500 g water to obtain Solution (20). First add Solution (19) drop-wise into Solution (20) to react and get a clear solution (21). Then add Solution (18) drop-wise into Solution (21) to react further and get a turbid solution. Continue agitation for 9 h after the adding ends and control the reaction temperature to 80° C. Finally, filter, wash, dry and comminute the yielded turbid solution to get the compound salt ADEP.

Example 4

Dissolve both 122 g di-ethyl hypophosphorous acid and 11 g methyl phosphorous acid in 250 g water to obtain Solution (22). Then add 48 g NaOH into Solution (22) to get the corresponding Na salt mixture Solution (23). Dissolve 84.9 g zirconium sulfate in 250 g water to obtain Solution (24). Then add Solution (23) drop-wise into Solution (24) to react and get a turbid solution. Continue agitation for 10 h after the adding ends and control the reaction temperature to 90° C. Finally, filter, wash, dry and comminute the yielded turbid solution to get the compound salt ADEP.

Or first dissolve 122 g di-ethyl hypophosphorous acid in 200 g water and add 40 g NaOH to obtain Solution (25). Then dissolve 11 g methyl phosphorous acid in 50 g water and also add 8 g NaOH to obtain Solution (26). Then dissolve 84.9 g zirconium sulfate in 250 g water to obtain Solution (27). Then first add Solution (26) drop-wise into Solution (27) to react further and obtain a clear Solution (29). Then add Solution (25) drop-wise into Solution (29) to react and get a turbid solution. Continue agitation for 10 h after the adding ends and control the reaction temperature to 90° C. Finally, filter, wash, dry and comminute the turbid solution to get the compound salt ADEP.

Example 5

Add 750 g zirconium hydroxide in a small kneading machine and set the temperature of the kneading machine to 130° C. Then mix 1220 g di-ethyl hypophosphorous acid and 110 g methyl phosphorous acid evenly before adding them drop-wise into the kneading machine to react for 6 h at the temperature. Then increase the temperature to 200° C. to continue the kneading for 6 h. Finally, move the materials out from the kneading machine and comminute them to get the compound salt ADEP.

Comparison of Experiment Effects

Take Example 2 as the example, add the ADEP prepared in Example 2 into various polyester, polyamide, polyolefin, polyurethane or rubber to test the flame retardation.

Group 1 of Example 2

Mix 50 g PBT, 20 g ADEP and 30 g GF (glass fiber reinforced material) evenly and then put them into a torque rheometer to mix where the temperature of the rheometer is controlled to 240° C.-260° C. Then use the extrusion kit to produce strips and granulate to obtain the flame retardant and reinforced PBT. This PBT does not yellow, shows no bubble and breaking and produces a flame retardant rating of UL-94-V0 (2 mm).

Group 2 of Example 2

Mix 50 g PET, 20 g ADEP and 30 g GF evenly and then put them into a torque rheometer to mix where the temperature of the rheometer is controlled to 240° C.-260° C. Then use the extrusion kit to produce strips and granulate to obtain the flame retardant and reinforced PET. This PET does not yellow, shows no bubble and breaking and produces a flame retardant rating of UL-94-V0 (2 mm).

Group 3 of Example 2

Mix 50 g TPEE, 20 g ADEP and 30 g GF evenly and then put them into a torque rheometer to mix where the temperature of the rheometer is controlled to 260° C.-300° C. Then use the extrusion kit to produce strips and granulate to obtain the flame retardant and reinforced TPEE. This TPEE does not yellow, shows no bubble and breaking and produces a flame retardant rating of UL-94-V0 (2 mm).

Group 4 of Example 2

Mix 50 g PA6, 20 g ADEP and 30 g GF evenly and then put them into a torque rheometer to mix where the temperature of the rheometer is controlled to 240° C.-260° C. Then use the extrusion kit to produce strips and granulate to obtain the flame retardant and reinforced PA6. This PA6 does not yellow, shows no bubble and breaking and produces a flame retardant rating of UL-94-V0 (2 mm).

Group 5 of Example 2

Mix 50 g PA66, 20 g ADEP and 30 g GF evenly and then put them into a torque rheometer to mix where the temperature of the rheometer is controlled to 260° C.-300° C. Then use the extrusion kit to produce strips and granulate to obtain the flame retardant and reinforced PA66. This PA66 does not yellow, shows no bubble and breaking and produces a flame retardant rating of UL-94-V0 (2 mm).

Group 6 of Example 2

Mix 58 g PA66, 12 g ADEP and 30 g GF evenly and then put them into a torque rheometer to mix where the temperature of the rheometer is controlled to 260° C.-300° C. Then use the extrusion kit to produce strips and granulate to obtain the flame retardant and reinforced PA66. This PA66 does not yellow, shows no bubble and breaking and produces a flame retardant rating of UL-94-V0 (2 mm).

Group 7 of Example 2

Mix 50 g PE, 20 g ADEP and 13 g MPP (synergetic P—N based flame retardant) evenly and then put them into a torque rheometer to mix where the temperature of the rheometer is controlled to 180° C.-200° C. Then use the extrusion kit to produce strips and granulate to obtain the flame retardant PE. This PE does not yellow, shows no bubble and breaking and produces a flame retardant rating of UL-94-V0 (2 mm).

Group 8 of Example 2

Mix 50 g TPU, 20 g ADEP and 13 g MPP evenly and then put them into a torque rheometer to mix where the temperature of the rheometer is controlled to 160° C.-200° C. Then use the extrusion kit to produce strips and granulate to obtain the flame retardant TPU. This TPU does not yellow, shows no bubble and breaking and produces a flame retardant rating of UL-94-V0 (2 mm).

Control Group

Mix 50 g PA66, 20 g ADP and 30 g GF evenly and then put them into a torque rheometer to mix where the temperature of the rheometer is controlled to 260° C.-300° C. Then use the extrusion kit to produce strips and granulate to obtain the flame retardant and reinforced PA66. This PA66 does not yellow, shows no bubble and breaking and produces a flame retardant rating of only UL-94-V2 (2 mm) which is far from UL-94-V0 (2 mm).

The experiment result revealed that:
when the organic phosphorous compound flame retardants prepared according to the present invention are added into polyester, polyamide, polyolefin, polyurethane or rubber, the products did not yellow and showed no bubbling and breaking. The flame retardation performance of those materials were obviously improved and the flame retardant ratings of PBT, PET, TPEE, PA6, PA66, PE, TPU reached UL-94-V0 (2 mm). Nevertheless, the PA66 added with ADP showed yellowing as well as bubbling and breaking and only a flame retardant rating of UL-94-V2 (2 mm). The flame retardant effects of the polyester, polyamide, polyolefin, polyurethane or rubber added with ADEP were far better than those added with ADP. Moreover, the excellent flame retardant effects can still be realized at a lower adding ratio of the flame retardant. Thus, the production cost was greatly reduced for the enterprise.

The examples described above are only the preferred implementations. Nevertheless, the implementations of the present invention shall not be limited by those examples. Any other changes, modifications, substitutions, combinations and simplifications that do not deviate from the spirit and principle of the present invention should be equivalent replacements and shall be included in the protection scope of the present invention.

What is claimed is:

1. A preparation method for organic phosphorus compound flame retardant, wherein the preparation method for organic phosphorus compound flame retardant comprises the following steps:

first drop-wise adding at least one from the water-soluble salts of alkyl phosphorous acid or water-soluble salts of phosphorous acid into a solution of water-soluble non-halogen II~IV valent metal salt to react and obtain a clear aqueous solution, then continuing to drop-wise at least one from the water-soluble salts of di-alkyl hypophosphorous acid or water-soluble salts of mono-alkyl hypophosphorous acid into the obtained clear aqueous solution, the adding ratios of various substances are as follows: the molar mass ratio between the total di-alkyl hypophosphite or mono-alkyl hypophosphite versus the total alkyl phosphite or phosphite is 1~10, the molar mass ratio between the total metal ions versus the total di-alkyl hypophosphite or mono-alkyl hypophosphite and alkyl phosphite or phosphite is 0.01~0.5, reaction temperature controlled to 0° C.~90° C., then continuing to agitate them 0~10 hours after the adding ended, finally filtering, washing, drying and comminuting the yielded turbid solution to obtain compound salt particles having a grain size of 0.001 μm to 100 μm, that is, the organic phosphorus compound flame retardant described above, wherein the structural formula (3) of the organic phosphorous compound flame retardants described above is:

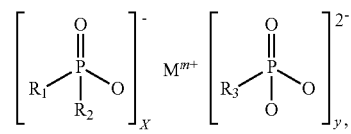

wherein: in the structural formula (3), the $R_1$ and $R_2$ are the same or not, and both at least one selected from hydrogen, saturated alkyl groups of C1~C6, aralkyl groups of C7~C18 or alkaryl groups of C7~C18, one or more rings between them; the $R_3$ is at least one selected from hydrogen, saturated alkyl groups of C1~C6, alkyl naphthenic group of C3~C18, aralkyl groups of C7~C18 or alkaryl groups of C7~C18; M is a II~IV valent metal element, m is 2~4, x and y are both positive numbers of no less than 0.01 but no more than 10, including but not limited to a positive integer.

2. The preparation methods for an organic phosphorous compound flame retardant according to claim 1, wherein the water-soluble salts of di-alkyl hypophosphorous acid or water-soluble salts of mono-alkyl hypophosphorous acid described above, and the water-soluble salts of alkyl phosphorous acid or water-soluble salts of phosphorous acid salt described above, are prepared respectively by means of a reaction between the corresponding di-alkyl hypophosphorous acid, mono-alkyl hypophosphorous acid, alkyl phosphorous acid and phosphorous acid, with any one from oxide, cyanide, or hydroxide of an alkali metal.

3. The preparation methods for an organic phosphorous compound flame retardant according claim 1, wherein the II~IV valent metal described above is at least one from Mg, Ca, Fe, Al, Zn, Sn, Mn, Ni, Ti, Ge, Ba, Sr, Ce and Zr.

\* \* \* \* \*